US005386231A

United States Patent [19]

Shimizu et al.

[11] Patent Number: 5,386,231

[45] Date of Patent: Jan. 31, 1995

[54] VIDEO CAMERA

[75] Inventors: Shuji Shimizu; Toshiaki Isogawa; Joichi Sato, all of Kanagawa, Japan

[73] Assignee: Sony Corporation, Japan

[21] Appl. No.: 983,251

[22] Filed: Nov. 30, 1992

Related U.S. Application Data

[63] Continuation of Ser. No. 679,312, Apr. 2, 1991, abandoned.

[30] Foreign Application Priority Data

Apr. 9, 1990 [JP] Japan .................................. 2-093705

[51] Int. Cl.$^6$ ......................... H04N 5/335; H04N 3/14

[52] U.S. Cl. .................................... 348/296; 348/294; 348/297; 348/300; 348/362; 348/367; 348/363; 348/229; 348/255

[58] Field of Search ................... 358/228, 209, 213.11, 358/213.19; H04N 5/217, 5/235, 5/243, 5/335

[56] References Cited

U.S. PATENT DOCUMENTS

| | | | |
|---|---|---|---|
| 4,805,024 | 2/1989 | Suzuki et al. | 358/213.19 |
| 4,884,134 | 11/1989 | Tsuji et al. | 358/98 |
| 5,065,248 | 11/1991 | Homma | 358/213.19 |
| 5,162,913 | 12/1992 | Chatenever et al. | 358/213 A |

FOREIGN PATENT DOCUMENTS

| | | | |
|---|---|---|---|
| 6377037 | 4/1986 | Japan | 358/228 |
| 1-212084 | 8/1989 | Japan | H04N 5/335 |
| 1-238382 | 9/1989 | Japan | H04N 5/335 |
| 1238382 | 9/1989 | Japan | H04N 5/335 |
| 1-246971 | 10/1989 | Japan | H04N 5/335 |
| 1-318366 | 12/1989 | Japan | H04N 5/335 |
| 2-215288 | 8/1990 | Japan | H04N 5/335 |
| 3-106275 | 5/1991 | Japan | H04N 5/335 |

OTHER PUBLICATIONS

JP 1-212083, Aug. 25, 1989, Solid State Image Pickup Device, Yoshihito Higashitsutsumi.

JP 64-77378, Mar. 23, 1989.

Applicant's Submitted Prior Art (pp. 1 and 5 of Disclosure dealing with JP 64-77378).

*Primary Examiner*—Michael T. Razavi
*Assistant Examiner*—Bipin Shawala
*Attorney, Agent, or Firm*—Sony Corporation

[57] ABSTRACT

A video camera includes a solid state image pickup element for converting a light image radiated thereon from an object to be photographed into an electric signal. The element is also operated as a shutter for controlling an amount of light radiated thereon by being controlled in its storage time. The video camera further includes a unit for inputting data for setting a storage time of the image pickup element, and a unit connected to the data inputting unit for controlling the storage time of the element in response to the inputted set data gradually to the set data by changing the storage time by a predetermined storage time for the lapse of every predetermined time period.

7 Claims, 3 Drawing Sheets

FIG. 1A (PRIOR ART)
FIG. 1B (PRIOR ART)
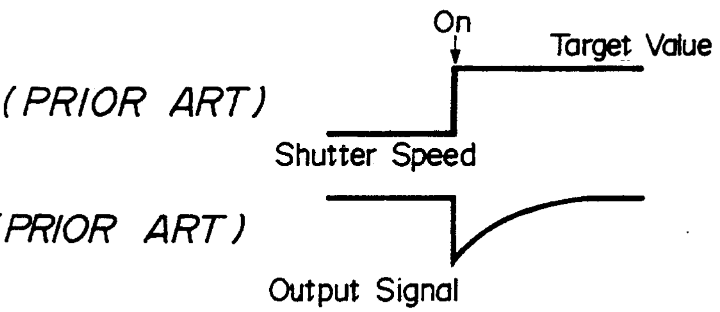
FIG. 2
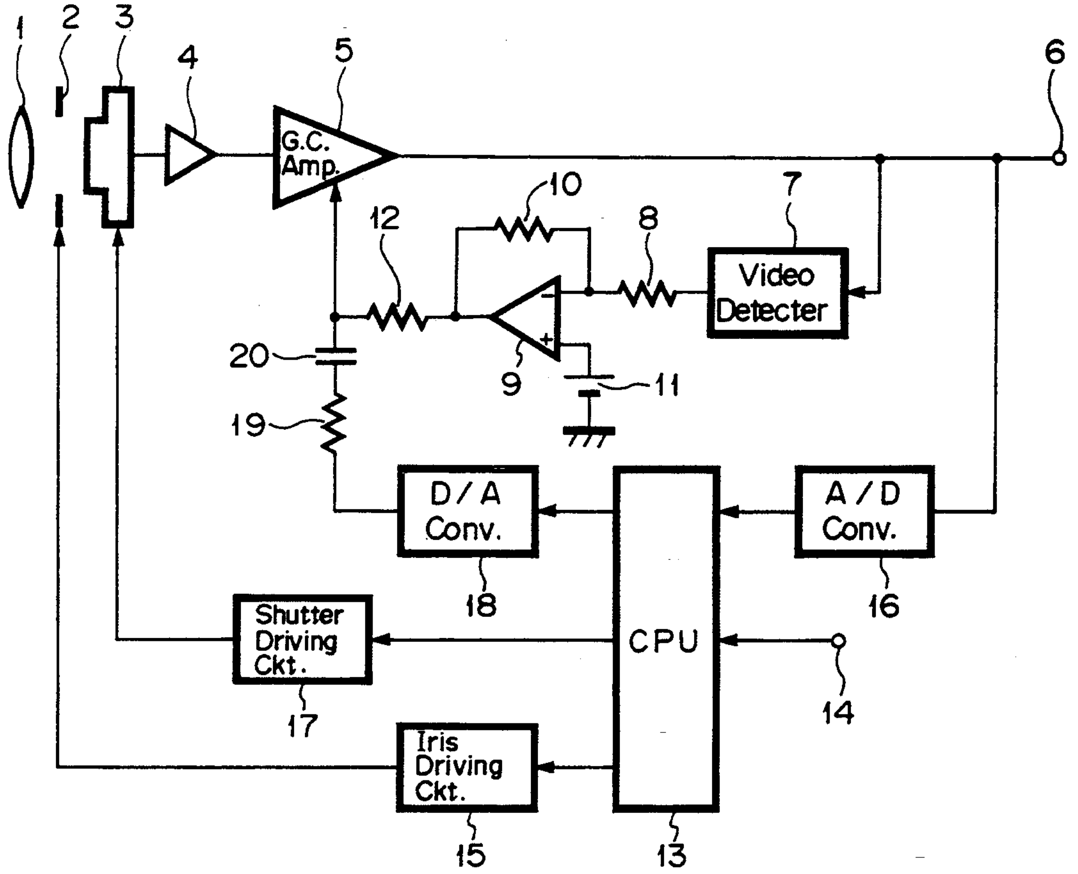

FIG. 3A
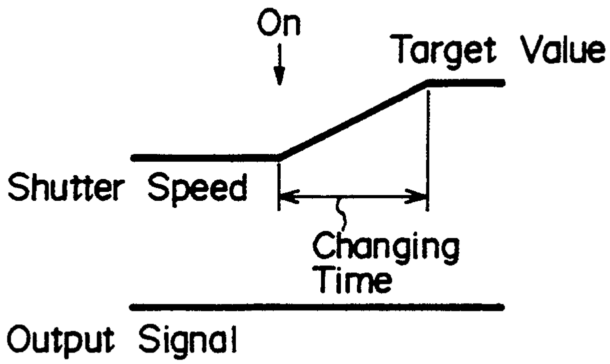
FIG. 3B
FIG. 4A
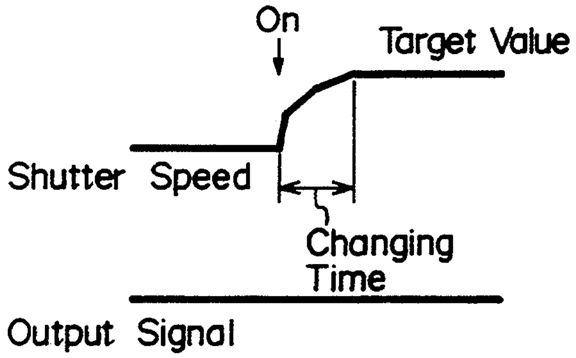
FIG. 4B
FIG. 5
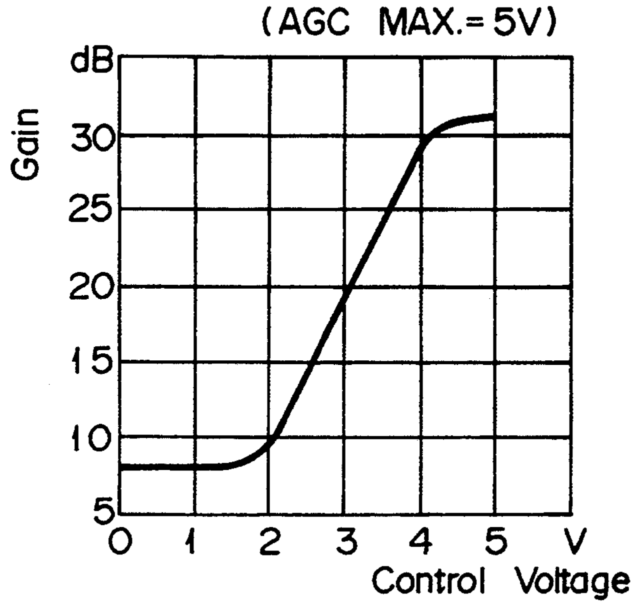

Storage Time

Level of Output Signal

Output of D/A Converter

Differentiated Signal

VIDEO CAMERA

This application is a continuation, of application Ser. No. 07/679,312 filed Apr. 2, 1991 now abandoned.

BACKGROUND OF THE INVENTION

Field of the Invention

The present invention generally relates to video cameras and, more specifically, to a video camera using a solid state image pickup element such as a charge-coupled device (CCD) or the like whose storage time can be changed so as to change the shutter speed of the camera.

Description of the Prior Art

In recent years, it has been proposed in a video camera using a solid state image pickup element such as a charge-coupled device (CCD) to control the shutter effect or speed of the camera by controlling the storage time of the CCD, as disclosed in Japanese Patent Laid-Open Publication (JP-A) No. 64-77378, for example.

It has also been investigated to make it possible to arbitrarily set the shutter speed, for example, so as to realize various effects of photographing.

When setting the shutter speed arbitrarily in the conventional video camera, the storage time of the solid state image pickup element is changed arbitrarily, so that the output signal level of the solid state image pickup element is also changed. Thus, if the shutter speed is changed from a maximum speed of one thousandth of a second (1/1000 sec.) to a target speed such as a normal speed of one sixtieth of a second (1/60 sec.) as shown in FIG. 1A, the output signal level of the image pickup element changes abruptly as shown in FIG. 1B to thereby cause distortion temporarily in the video signal such as saturation or lack of sufficient level.

In the video camera, an automatic gain control (AGC) amplifier is generally provided at the output side of the CCD. The AGC amplifier is generally provided with a time constant of several seconds in order to eliminate the distortion of the output signal level of the CCD due to noise and the like, so that the AGC amplifier can not follow the output signal level of the CCD when the shutter speed is changed abruptly.

OBJECTS AND SUMMARY OF THE INVENTION

Accordingly, it is a general object of the present invention to provide an improved video camera in which the aforementioned shortcomings and disadvantages of the prior art can be eliminated.

More specifically, it is an object of the present invention to provide an improved video camera with a simplified circuit configuration which is capable of delivering a video signal whose level is always stable even if the shutter speed is changed.

According to an aspect of the present invention, a video camera is comprised of a solid state image pickup element for converting a light image radiated thereon from an object to be photographed into an electric signal, the element also being operated as a shutter for controlling an amount of light radiated thereon by being controlled in its storage time, a unit for inputting data for setting a storage time of the image pickup element, and a unit connected to the data inputting unit for controlling the storage time of the element in response to the inputted set data gradually to the set data by changing the storage time by a predetermined storage time for the lapse of every predetermined time period.

The above and other objects, features, and advantages of the present invention will become apparent from the following detailed description of an illustrative embodiment thereof to be read in conjunction with the accompanying drawings.

BRIEF DESCRIPTION OF THE DRAWINGS

FIGS. 1A, 1B is a timing chart illustrating a relation between the change of the shutter speed and a waveform of an output signal of a gain control amplifier in the conventional video camera;

FIG. 2 is a block diagram illustrating an embodiment of a video camera according to the present invention;

FIGS. 3A, 3B is a timing chart illustrating one example of a relation between the change of the shutter speed and a waveform of an output signal of a gain control amplifier according to an embodiment of the present invention;

FIGS. 4A, 4B is a timing chart illustrating another example of relation between the change of the shutter speed and the waveform of the output signal of the gain control amplifier according to another embodiment of the present invention;

FIG. 5 is a diagram illustrating an example of a control voltage versus gain characteristics of a gain control amplifier.

DETAILED DESCRIPTION OF THE PREFERRED EMBODIMENT

Figure 6A:
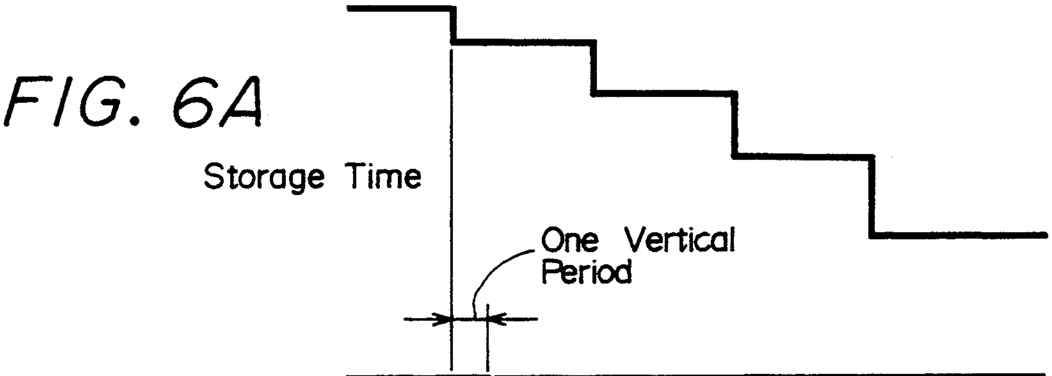
FIGS. 6A, 6B, 6C, 6D is a timing chart illustrating relation of storage time of a solid state image pickup element and waveforms of signals at various points of the embodiment of FIG. 2.

A video camera according to the preferred embodiment of the present invention will now be described with reference to the drawings.

Referring to FIG. 2, an image light from an object (not shown) is focused by a lens system 1 and applied to a solid state image pickup element 3 such as a charge-coupled device (CCD) through a stop 2.

An output signal from the image pickup element 3 is supplied to a gain control (GC) amplifier 5 through a buffer amplifier 4. An output signal from the gain control amplifier 5 is applied to an output terminal 6 as a video output signal on one hand and also applied to a detecting circuit 7 on the other hand which in turn detects a voltage level of an amplitude of the output signal of the amplifier 5. An output signal representing the detected voltage level from the detecting circuit 7 is applied to an inverted input terminal of a differential amplifier 9 through a resistor 8. An output of the differential amplifier 9 is fed back to the inverted input terminal thereof through a resistor 10 and a reference voltage from a reference voltage source 11 is applied to a non-inverted input terminal of the differential amplifier 9, so that the differential amplifier 9 delivers a signal of an error component representing a difference of the detected amplitude level of the detecting circuit 7 from the reference voltage level. The error component is applied to a gain control terminal of the gain control amplifier 5 through a resistor 12.

The amplifier 5 in turn delivers to the output terminal 6 an output signal whose level is controlled so as to be substantially the same as the reference of the reference voltage source 11. Now, the circuit arrangement for performing this level control is provided with a time constant of several vertical scanning periods of the video signal.

Data for manually setting a shutter speed of the solid state image pickup element 3 is applied from, for example, an input terminal 14 to a central processing unit (CPU) 13 for controlling the video camera generally. The CPU 13 then generates and applies control data based on the manually setting data to a shutter driving circuit 17 which in turn sets a storage time of the solid state image pickup element 3 in accordance with the control data manually.

Under this state, the output signal from the gain control amplifier 5 is also applied to an analog-to-digital (A/D) converting circuit 16. The A/D converting circuit 16 converts the output signal from the amplifier 5 into digital data and then applies it to the CPU 13 which in turn calculates data of an opening degree of the stop 2 for setting the digital data from the A/D converting circuit 16 to a predetermined value and then applies the calculated data of the opening degree to a stop driving circuit 15 to thereby control the opening degree of the stop 2.

When the shutter speed of the CCD 3 is controlled by the CPU 13 in response to the manually setting data, the CPU 13 applies digital data of a pregiven value to a digital-to-analog (D/A) converting circuit 18 which in turn converts the digital data to -an analog voltage of the pregiven value and applies the analog voltage to the gain control terminal of the amplifier 5 as the gain control voltage through a differential circuit formed of a resistor 19 and a capacitor 20.

The CPU 13 further controls the control data for controlling the shutter speed of the element 3 in a manner that a value of the control data is changed gradually by changing it by a predetermined value once at a time when changing the value thereof. Namely, in the JP-A 64-77378, the control of the shutter speed, i.e. a storage time, is performed by changing the shutter speed per one horizontal scanning period of the video signal. Thus, in the present embodiment, the control data for controlling the shutter speed is preferably controlled so that the shutter speed is changed by one horizontal scanning period, for example, at every one vertical scanning period of the video signal when changing the shutter speed. In this case, the shutter speed can be changed gradually to a target value as shown in FIG. 3A and so the output signal of the gain control amplifier 5 becomes stable as shown in FIG. 3B since the shutter speed is changed gradually.

Now, in this circuit configuration, the change of the output signal of the amplifier 5 due to the change of the shutter speed becomes larger in a range where the shutter speed is high, that is, the storage time is short, since the rate of change of storage time at one control time becomes larger in this range. Thus, in this embodiment, in a range where the shutter speed is low, that is, a range where the change of the output level of the amplifier 5 is low despite the change of the shutter speed, an amount of change of the shutter speed at one control time is preferably weighted to be increased to a value larger than the one horizontal scanning period, to thereby decrease the changing period of the shutter speed as shown in FIG. 4A. In this case, the output signal level of the amplifier 5 can be made stable as shown in FIG. 4B.

The weighting of the amount of the change of the shutter speed at one control time in a video camera conforming to the National Television System Committee (NTSC) standards can be set as shown in the following table 1, for example.

TABLE 1

| range of shutter speed | number of step(s) changed at one time |
|---|---|
| 1/60 sec.-1/125 sec. | 4 |
| 1/125 sec.-1/250 sec. | 3 |
| 1/250 sec.-1/500 sec. | 2 |
| 1/500 sec.-1/1000 sec. | 1 |

In this table, one step corresponds to one horizontal scanning period, for example.

In this circuit configuration, if the video camera is accorded with the NTSC standards, the number of steps n of the shutter speed to be changeable at one time is in a range of 0–261, that is 262 kinds. Thus, the shutter speed 1/T(n), when the number of the steps of the shutter speed changed at one time is n, can be represented by $$\frac{1}{T(n)} = \frac{1}{(262_{-n}) \times 63.56 \times 10^{-6} + 34.78 \times 10^{-6}} \text{ (second)}$$

An amount of the change of the gain of the gain control amplifier 5 when the shutter speed is changed from n to (n+1), that is, increased by one step, can be given by $$20_{log}\left\{\frac{1/T(n)}{1/T(n+1)}\right\}(dB)$$

Now, as the gain control amplifier 5, this embodiment can use such an amplifier as that having control voltage versus gain characteristics of FIG. 5 where the gain is linearly changed with the changes of the control voltage. In this case, when changing the shutter speed of the CCD 3, the change of the output voltage level of the gain control amplifier 5 due to the change of the shutter speed can be corrected or compensated by applying a correcting voltage in a manner of a pulse voltage whose value is in proportional to the number of the steps changed at one time as the pregiven value voltage to the gain control terminal of the amplifier 5.

Figure 6B:
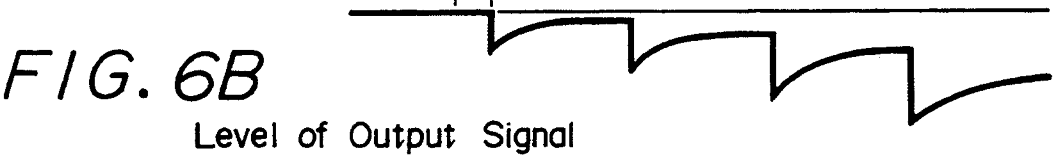

Namely, when the shutter speed, i.e. a storage time, of the CCD 3 is changed in a manner as shown in FIG. 6A, the output level of the solid state image pickup element 3 changes in the same manner as the storage time with a time delay of one vertical scanning period and so the output signal level of the gain control amplifier 5 changes as shown in FIG. 6B.

Figure 6C:
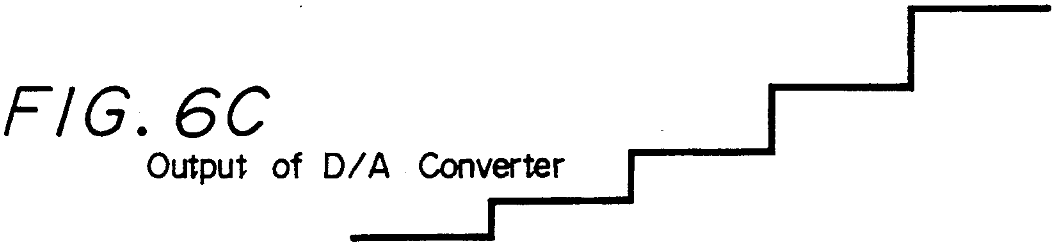
Figure 6D:
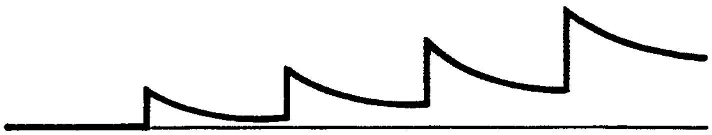

With the change of the shutter speed of the CCD 3, the CPU 13 delivers the digital data of the predetermined value in proportional to the output level of the solid state image pickup element 3 to the D/A converter 18 which in turn converts the digital data into the analog signal shown in FIG. 6C. The analog signal is differentiated by the differential circuit composed of the resistor 19 and the capacitor 20 and then applied to the gain control amplifier 5 as the gain control voltage in a manner of a pulse signal shown in FIG. 6D.

Thus, in this embodiment, the gain of the gain control amplifier 5 is controlled when the shutter speed of the solid state image pickup element 3 is changed so as to correct or compensate the change of the output level of the gain control amplifier 5 due to the change of the shutter speed to thereby deliver a stable video output signal to the output terminal 6.

Therefore, according to this embodiment, the storage time is changed gradually and so the output level of the solid state image pickup element 3 is prevented from being changed abruptly to thereby deliver the output video signal whose level is always stable.

Now, the time constant of the differential circuit and the pregiven value delivered from the CPU 13 are determined in accordance with the loop characteristics of the gain control amplifier 5 and the photoelectric conversion characteristics of the CCD 3 and so forth and so they can be previously set by setting the values of the circuit elements and so forth thereof.

Further, the present invention is also applicable to the video camera accorded with the Phase-Alteration Line (PAL) system. In this case, the weighting of the amount of the change of the shutter speed at one control time in a video camera accorded with the PAL system can be set as shown in the following table 2, for example.

TABLE 2

| range of shutter speed | number of step(s) changed at one time |
|---|---|
| 1/50 sec.-1/125 sec. | 6 |
| 1/125 sec.-1/250 sec. | 4 |
| 1/250 sec.-1/500 sec. | 2 |
| 1/500 sec.-1/1000 sec. | 1 |

According to the video camera of the present invention, in when photographing an object by using the video camera in a state of preferentially determining the shutter speed and the opening degree of the stop, the correction or compensation of the exposure due to the control of the shutter speed can be performed satisfactorily and so various effects of photographing can be effectively performed.

Further, according to the present invention, the storage time can be changed gradually and so the output level of the solid state image pickup element can be prevented from being changed abruptly in case of changing the shutter speed to thereby make it possible to deliver the output video signal whose level is always stable.

Having described a preferred embodiment of the invention with reference to the accompanying drawings, it is to be understood that the invention is not limited to the precise embodiment and that various changes and modifications thereof could be effected by one skilled in the art without departing from the spirit or scope of the novel concepts of the invention as defined in the appended claims.

We claim as our invention:

1. A video camera, comprising:

a solid state image pickup element having a variable storage time related to shutter speed of the video camera;

means for controlling the storage time of said solid state image pickup element to present a variable shutter effect including means for selectively changing the storage time of the solid state image pickup element at a preset frequency and by a preset unit amount; and output control means coupled to the solid state image pickup element for providing a stable output from the solid state image pickup element by adjusting the output of the solid state image pickup element according to the preset frequency and the preset unit amount;

wherein the output control means includes means for providing a correcting voltage to the output from the solid state image pickup, the correcting voltage being a pulsing voltage with a frequency related to the preset frequency and an amplitude related to the preset unit amount.

2. A video camera according to claim 1 wherein the correcting voltage providing means includes amplifier means having an adjustable gain responsive a gain control signal, and gain adjustment means for providing the gain control signal, the gain control signal varying according to the preset frequency and the preset amplitude.

3. A video camera according to claim 2 wherein the gain adjustment means includes a differentiator circuit for providing a differentiated signal proportional to the predetermined frequency to the amplifier means.

4. A video camera according to claim 3 wherein the differentiator circuit has an input which is coupled to an output of the amplifier means via a central processing unit.

5. A video camera according to claim 1, wherein the means for selectively changing the storage time of the solid state image pickup element changes the storage time of the video camera once for every horizontal scanning period of a video signal.

6. A video camera according to claim 5, wherein the means for selectively changing the storage time of the solid state image pickup element changes the storage time of the video camera at every vertical scanning period of the video when changing the shutter speed.

7. A video camera according to claim 1, wherein the means for selectively changing the storage time of the solid state image pickup element changes the storage time of the video camera gradually in a number of steps related to the range of shutter speed, so that the number of steps changed at one time for a slower shutter speed is greater than the number of steps changed at one time for a faster shutter speed.

* * * * *